United States Patent
Arredondo et al.

(10) Patent No.: US 10,725,766 B2
(45) Date of Patent: Jul. 28, 2020

(54) SYSTEMS AND METHODS TO ASSIGN VARIABLE DELAYS FOR PROCESSING COMPUTER SYSTEM UPDATES

(71) Applicant: DELL PRODUCTS, LP, Round Rock, TX (US)

(72) Inventors: Isai Arredondo, Lago Vista, TX (US); Nathan F. Martell, Taylor, TX (US); Srikanth Kondapi, Austin, TX (US); Warren M. Byle, Round Rock, TX (US)

(73) Assignee: Dell Products, L.P., Round Rock, TX (US)

(*) Notice: Subject to any disclaimer, the term of this patent is extended or adjusted under 35 U.S.C. 154(b) by 138 days.

(21) Appl. No.: 15/978,654

(22) Filed: May 14, 2018

(65) Prior Publication Data
US 2019/0347085 A1 Nov. 14, 2019

(51) Int. Cl.
| G06F 11/00 | (2006.01) |
| G06F 8/65 | (2018.01) |
| G06F 11/07 | (2006.01) |
| G06F 11/27 | (2006.01) |
| G06F 11/22 | (2006.01) |
| G06F 11/263 | (2006.01) |
| G06F 11/34 | (2006.01) |

(52) U.S. Cl.
CPC .............. *G06F 8/65* (2013.01); *G06F 11/076* (2013.01); *G06F 11/0709* (2013.01); *G06F 11/0793* (2013.01); *G06F 11/2242* (2013.01); *G06F 11/263* (2013.01); *G06F 11/27* (2013.01); *G06F 11/3452* (2013.01); *G06F 11/3466* (2013.01)

(58) Field of Classification Search
CPC ............ G06F 11/3452; G06F 11/3466; G06F 11/0793; G06F 11/008; G06F 8/61; G06F 8/65
See application file for complete search history.

(56) References Cited

U.S. PATENT DOCUMENTS

| 8,978,028 | B2 | 3/2015 | Flaming et al. | |
| 9,672,023 | B2* | 6/2017 | Matthew | G06F 8/60 |
| 2014/0227976 | A1* | 8/2014 | Callaghan | G06F 8/65 455/41.2 |
| 2014/0359602 | A1 | 12/2014 | Sawaya et al. | |
| 2017/0364380 | A1 | 12/2017 | Fry, Jr. et al. | |
| 2018/0375891 | A1* | 12/2018 | Juncker | G06F 21/62 |

* cited by examiner

*Primary Examiner* — Charles Ehne
(74) *Attorney, Agent, or Firm* — Larson Newman, LLP

(57) ABSTRACT

A method for applying an update includes sending a registration request to an update web service; receiving a delay parameter from the update service; checking for an update; comparing the update release date and the delay parameter with the current date to determine if the update should be installed; and installing the update when the current date is determined to be past the update release date plus the delay parameter.

15 Claims, 5 Drawing Sheets

SYSTEMS AND METHODS TO ASSIGN VARIABLE DELAYS FOR PROCESSING COMPUTER SYSTEM UPDATES

FIELD OF THE DISCLOSURE

This disclosure generally relates to information handling systems, and more particularly relates to systems and methods to assign variable delays for processing computer system updates.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

SUMMARY

A method for applying an update can include sending a registration request to an update web service; receiving a delay parameter from the update service; checking for an update; comparing the update release date and the delay parameter with the current date to determine if the update should be installed; and installing the update when the current date is determined to be past the update release date plus the delay parameter.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

Figure 1:
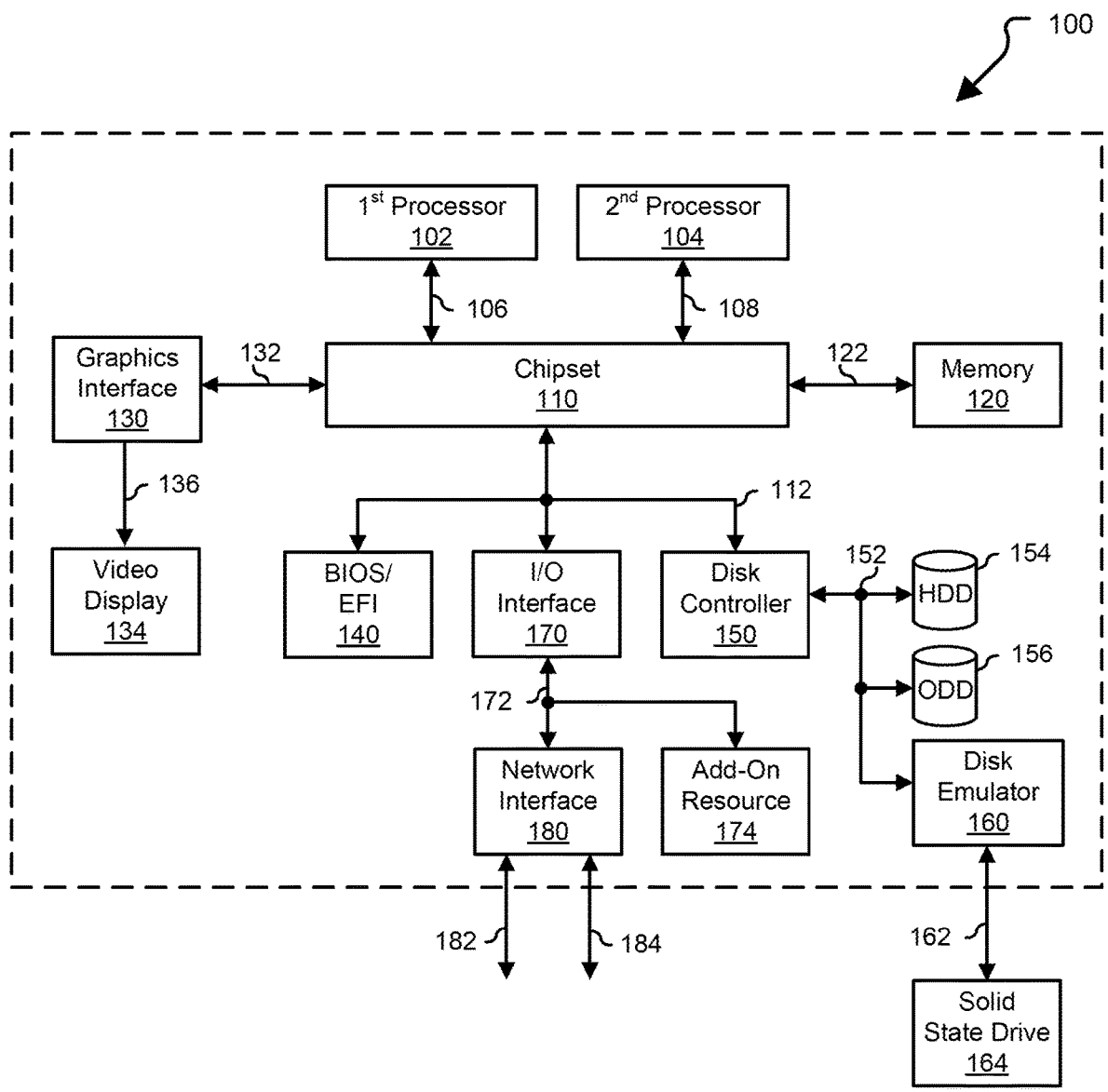
FIG. 1 is a block diagram of an information handling system according to one aspect of the disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1134 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Software suppliers periodically provide updates to the software and firmware. These updates can fix bugs, provide new features, improve performance, increase security, and the like. Given the complexity of information handling systems, there can be a need to apply numerous software and firmware updates on a regular basis. Additionally, due to the variety of system states, it can be impossible to test every possible update scenario prior to releasing an update. For example, information handling systems can include a variety of hardware and software components and each component can be at a different firmware or software version. Even though every effort can be made to test an update before release, it is not uncommon for an update to cause an issue on a subset of systems. When this update is applied to thousands, tens of thousands, hundreds of thousands or more systems, even a small failure rate can cause a significant problem.

Staging updates so that they are applied to only a subset of systems that is generally representative of the variety of system states can reduce the number of systems having a failed update at a time. A staged rollout of the update can also identify problematic updates prior to attempting to apply the updates on a larger scale.

Figure 2:
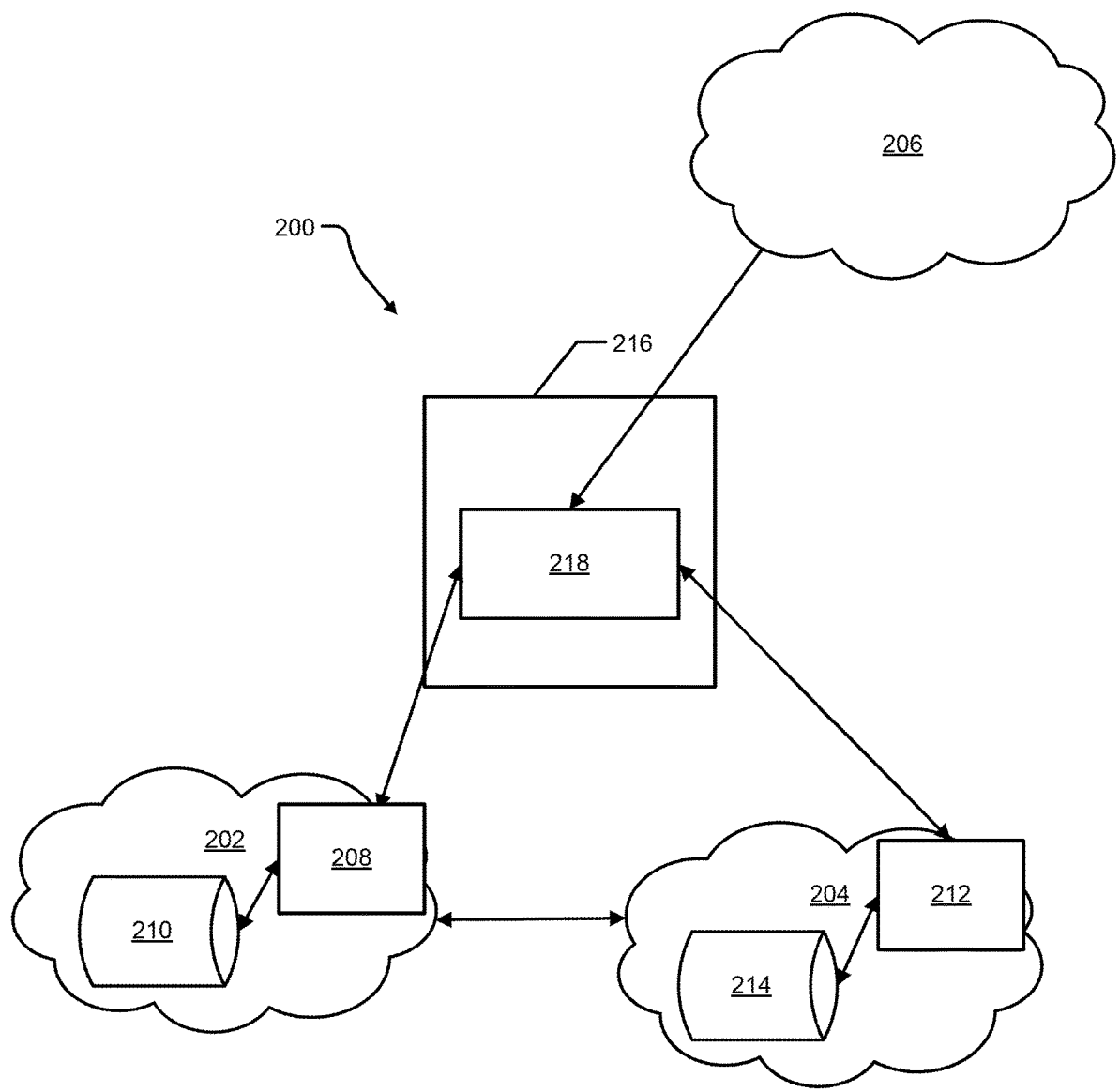
FIG. 2 is a block diagram of an update management system according to aspects of the disclosure.

FIG. 2 illustrates an update system 200 for the staged rollout of updates. System 200 can include an Update Web Service 202, a Telemetry Service 204, and Update Infrastructure 206. Update Web Service 202 can include a Web Services API 208 and a Web Services Data Storage 210. Telemetry Service 204 can include a telemetry API 212 and Telemetry Data Storage 214.

Client system 216, which in an embodiment can be similar to information handling system 100 of FIG. 1, can include an Update Application 218 for communication with the Web Services API 208 of the Update Web Service 202, the Telemetry API 212 of the Telemetry Service 204, and the Update Infrastructure 206. Update Application 218 can register with Update Web Service 202 using the Web Services API 212. The Update Web Service 202 can assign the Client System 216 to a group or ring and provide the Update Application 218 with a ring identifier or other indication of an update delay. Update Application 218 can check with the Update Infrastructure 206 to determine if an update is available. When an update is available, the Update Application 218 can use the ring identifier or update delay to determine how long to delay installation of the update. Alternatively, the Update Infrastructure 206 or the Update Web Service 202 can provide a filtered list of available updates based on the group or ring or the update delay.

Once the delay is passed, the Update Application 218 can install the update and provide telemetry information, such as an install return code and installer logs, to the Telemetry Service 204. The Telemetry Service 204 can use the telemetry information to determine a failure rate for the update as well as identifying subgroups of system that may have problems installing the update. If the failure rate is too high for the update, the update can be removed from the Update Infrastructure 206 to prevent additional systems from installing the update. Alternatively, if the update has a high failure rate for only a subgroup of client systems, that subgroup may be excluded from the update until changes are made to address the failure rate. For example, client systems that are several updates behind may be required to install an intermediate update prior to installing the update to have a more stable update path. Additionally, the telemetry data can be used to help identify how and when the update is failing so that the update can be corrected before being rolled out to a larger group of systems.

Figure 3:
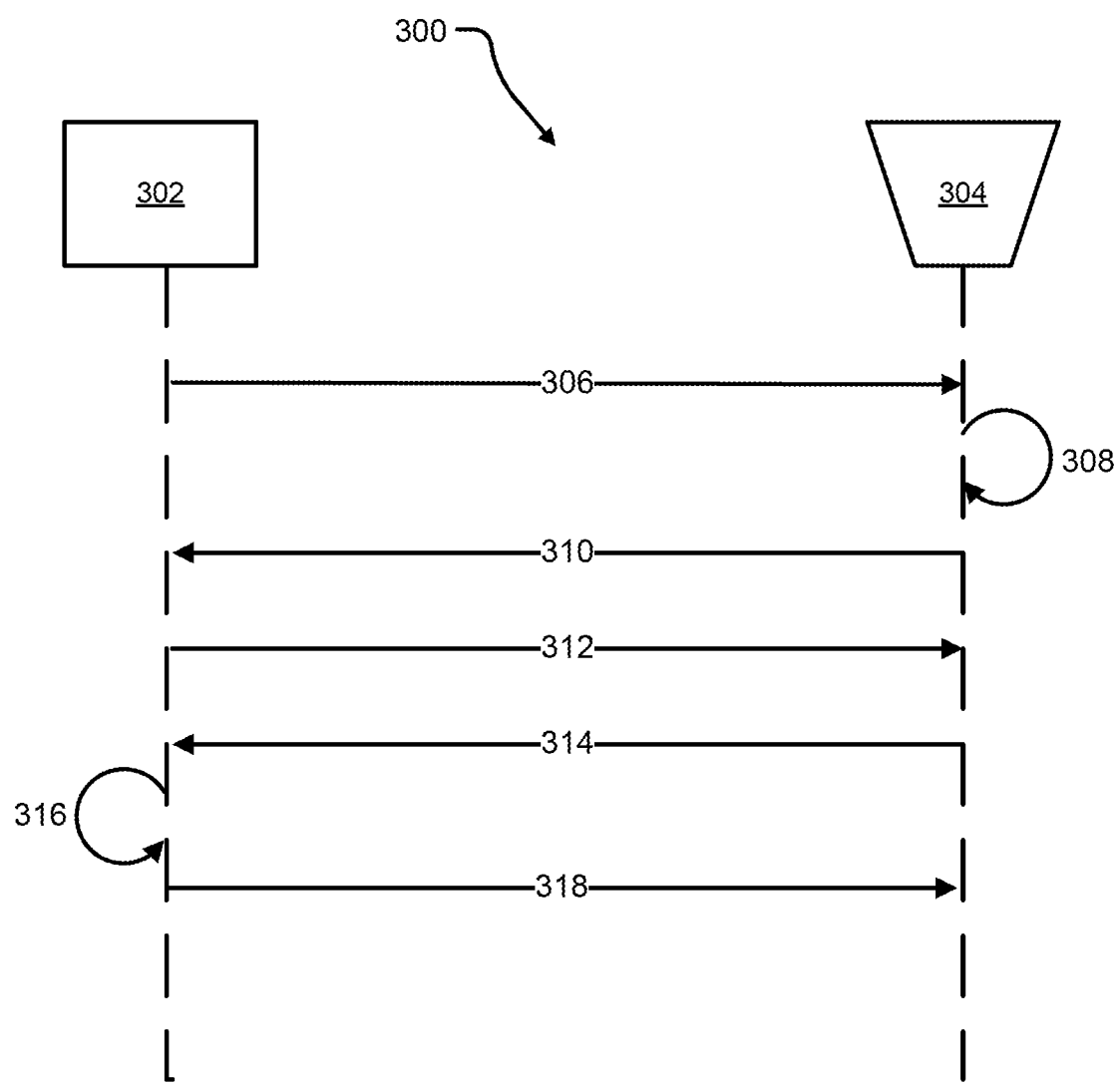
FIG. 3 is a data flow diagram of communication between a client system and an update management system according to aspects of the disclosure.

FIG. 3 illustrates an exemplary communication 300 between a client system 302 and an update system 304, such as update system 200 of FIG. 2. The client system 302 sends a registration request to the update system 304 at 306. In various embodiments, the registration request can include information such as platform type, a service tag number, or other information to identify the system. Additionally, the registration request can include information about installed hardware and other factors that can affect installation of updates.

At 308, the update system 304 can use the information contained in the registration request to assign an update group to the client system 302. The update group can be determined based on factors like the platform type, sales numbers of the platform type, the number of registered systems of the platform type, the hardware configuration, additional installed hardware, opt in or out of the early access group, an update history, such as including a history of failed updates or a history of delayed update installation, other factors, and any combination thereof.

Generally, the update system 304 can assign a portion of systems of a particular type or configuration to a initial update group (Ring 0) that can receive and install the update immediately and assign a larger portion of systems of that particular type or of similar configuration to a delayed update group (Ring 1). In other embodiments, there can be additional groups that are further delayed such that installation of updates is staggered. For example, Ring 0 can include about 1% of registered systems, Ring 1 can include about 10% of registered systems, and Ring 2 can include the remaining about 89% of registered systems. Alternatively, about 10% of the registered systems can be included in Ring 0 and about 90% can be included in Ring 1. Other distributions are possible as contemplated by one of skill in the art, but generally earlier groups have a smaller number of registered systems than later groups. Additionally, the update system 304 can consider if the client system 302 has opted into being part of Ring 0 (opted into early installation of updates) or opted out of Ring 0 (opted out of installing updates early).

At 310, the update system 304 can provide an update delay factor to the client system 302. At 312, the client system 302 can check with update system 304 to determine if an update is available. At 314, the update system 304 can provide the available updates to the client system 302. At 316, the client system can determine if the update is ready for installation and install the update. The client system 302 can calculate the available date by adding the update delay factor to the update release date and can determine if the current date is past the available date. When the current date is past the available date, that is the client system is scheduled to receive the update, the client system can install the update. In alternative embodiments, the update system 304 can determine which updates are available to the client system 302 based on the delay factor or group to which the client system 302 is assigned. In such an embodiment, the update system 304 may only provide updates to the client system 302 after the available date for the client system 302.

At 318, the client system 302 can provide telemetry data for the update process to the update system 304. The telemetry data can include the status of the update (success or failure), any error codes generated by the update process, and installer logs, version updates after installation and after next boot, and other information that may be helpful in determining why an update failed.

In various embodiments, the client system 302 can check with the update system 304 for an updated delay factor. The update system 304 can periodically reassign the groups or rings so that a client system may not stay in the first test group. Additionally, client systems can go out of service, so reassigning groups can ensure the correct mix of active client systems in each group. IN particular, when reassigning client systems, the update system 304 may exclude from Ring 0 client systems that routinely delay installing updates until after the Ring 1 delay. The client system 302 may check for and receive an updated delay factor not more frequently than about once a week, such as not more frequently than about once a month, even not more frequently than about once a quarter.

Figure 4:
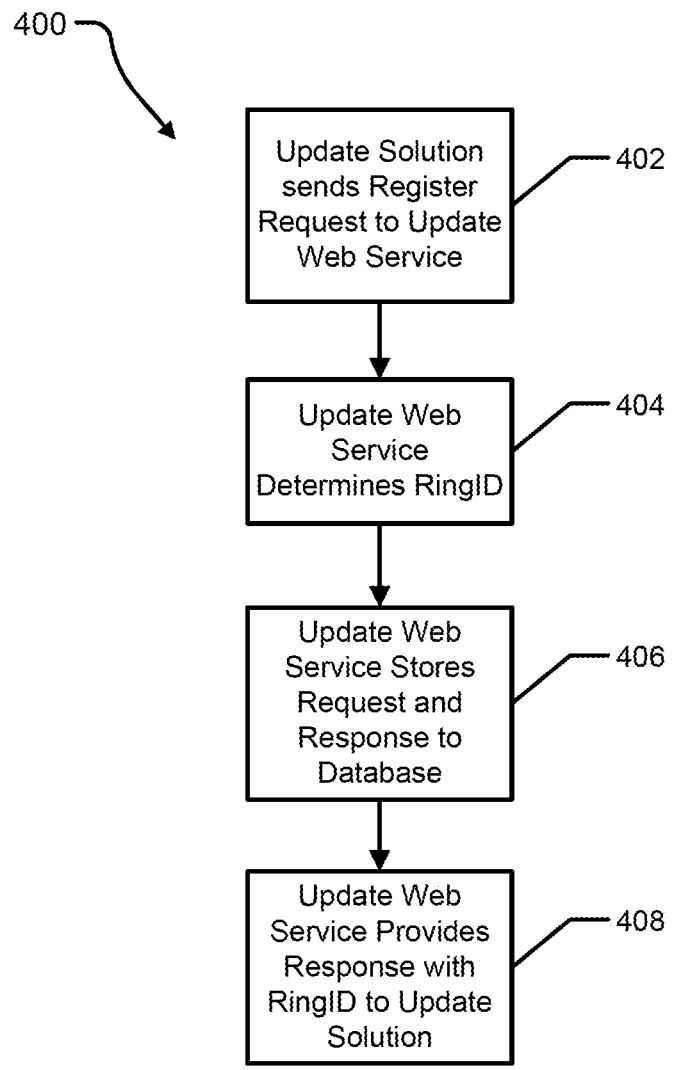
FIG. 4 is a flow diagram illustrating an exemplary process of registering with an update management system in accordance to aspects of the disclosure.

FIG. 4 is a flow diagram illustrating a method 400 of registering with an update service. At 402, the update solution of a client system can send a registration request to an update web service. The registration request can include identifying information to enable the update web service to classify the client system. At 404, the update web service can determine a ring identifier, such as based on the information included in the registration request. At 404, the update web service can store the ring identifier and at least a portion of the identifying information to a database. At 408, the update web service can provide a response to the update solution including the ring identifier or an update delay factor.

In various embodiments, the update web service can periodically reassign the ring identifiers. For example, the update web service can retrieve the identifying information form the database for a plurality of systems and assign them to new groups, such that at least a portion of the systems in Ring 0 are assigned to Ring 1 and a portion of the systems in Ring 1 are assigned to Ring 0. In various embodiments, a ring assignment history can be recorded an utilized when reassigning groups. Additionally, update failures can be a factor when reassigning groups. For example, a system that experiences an update failure may be excluded from Ring 0 for a time to reduce the likelihood of subsequent update failures as frequent update failures can cause a customer or user to have a poor impression of product quality. The new ring identifiers and update delay factors can be provided to the client systems. For example, the client system can periodically check in with the update web server or the update web service can push the updated information to the client systems.

Figure 5:
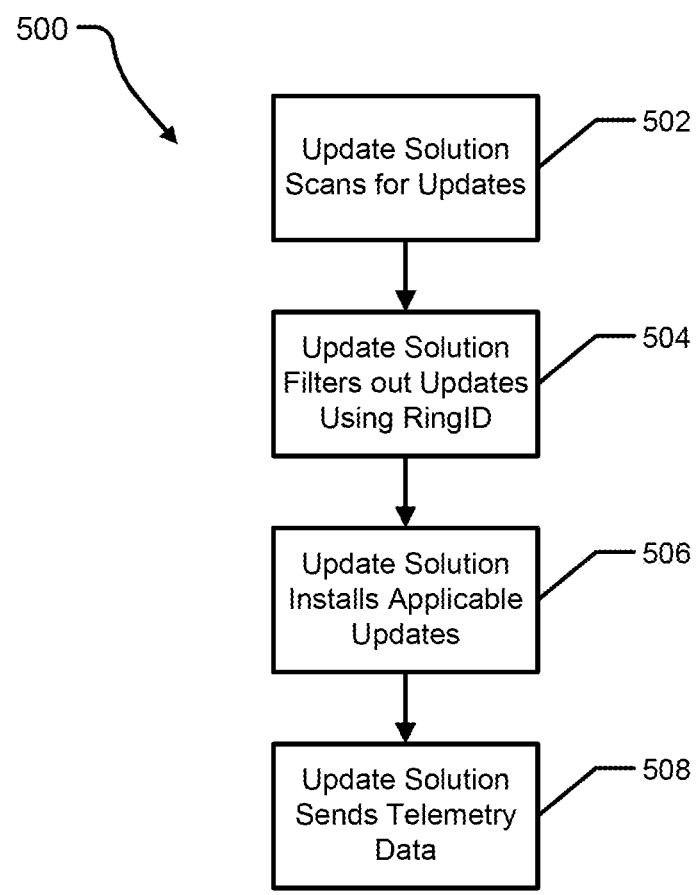
FIG. 5 is a flow diagram of updating an information handling system in accordance with aspects of the disclosure.

FIG. 5 is a flow diagram illustrating an exemplary method 500 of installing an update on a client system. At 502, the update solution can scan for updates. For example, the update solution can retrieve a list of recently available updates from an update server. At 504, the update solution can filter the available updates based on the assigned ring identifier. For example, the update solution can filter updates based on an update delay factor so that very recent updates that are not yet available based on the ring identifier are filtered from the available updates. The update solution can then install applicable updates, as indicated at 506. At 508, the update solution can send telemetry data to a telemetry service.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method for applying an update, comprising:
sending a registration request to an update web service;
receiving a delay parameter from the update service;
obtaining an updated delay parameter from the update service no more frequently than monthly;
checking for an update;
comparing the update release date and the delay parameter with the current date to determine if the update should be installed; and
installing the update when the current date is determined to be past the update release date plus the delay parameter.

2. The method of claim 1, wherein the registration request includes a system identifier, a service tag number, hardware configuration information, or a combination thereof.

3. The method of claim 1, wherein obtaining the updated delay parameter occurs no more frequently than quarterly.

4. The method of claim 1, further comprising providing an update status to a telemetry service.

5. The method of claim 4, further comprising providing installer logs to the telemetry service.

6. A method for providing an update to a client system, comprising:
receiving a registration from the client system;
assigning the client system to a group;
providing a delay parameter to the client system;
receiving an update status from the client system;
determining a failure rate for an update based on the update status;
removing the update from distribution if the failure rate exceeds a threshold; and
periodically reassigning the client system to one of the groups.

7. The method of claim 6, wherein the registration request includes a system identifier, a service tag number, hardware configuration information, or a combination thereof.

8. The method of claim 7, assigning the client system to a group is based on the system identifier, a service tag number, hardware configuration information, or a combination thereof.

9. The method of claim 6, wherein the reassigning the client system occurs no more frequently than weekly.

10. The method of claim 6, further comprising receiving installer logs from the client system when the update status indicates an error.

11. An information handling system comprising:
a storage; and
a processor in communication with the storage and configured to:
receive a registration from a client system;
assign the client system to one of a plurality of groups;
provide a delay parameter to the client system;
receive an update status from the client system;
determine a failure rate for an update based on the update status;
remove the update from distribution if the failure rate exceeds a threshold; and
periodically reassign the client system to one of the groups.

12. The information handling system of claim 11, wherein the registration request includes a system identifier, a service tag number, hardware configuration information, or a combination thereof.

13. The information handling system of claim 12, wherein the processor is further configured to assign the client system to a group based on the system identifier, a service tag number, hardware configuration information, or a combination thereof.

14. The information handling system of claim 11, wherein the reassigning the client system occurs no more frequently than weekly.

15. The information handling system of claim 11, wherein the processor is further configured to receive installer logs from the client system when the update fails.

* * * * *